United States Patent Office 3,093,686
Patented June 11, 1963

3,093,686
PRODUCTION OF CYCLIC ALCOHOLS AND KETONES
Walter Simon, Hans Joachim Waldmann, and Rudolf Melan, Ludwigshafen (Rhine), and Ernst Plauth, Bad Durkheim, Germany, assignors to Badische Anilin- & Soda-Fabrik Aktiengesellschaft, Ludwigshafen (Rhine), Germany
No Drawing. Filed June 4, 1957, Ser. No. 663,370
Claims priority, application Germany June 6, 1956
2 Claims. (Cl. 260—586)

This invention relates to a process for the oxidation of saturated cycloaliphatic compounds. In particular, the invention relates to a process for the oxidation of saturated cycloaliphatic compounds in the liquid phase with oxygen or gases containing oxygen in the presence of metallic oxidation catalysts, in which cyclohexanol and cyclohexanone are mainly formed.

It is known that saturated cycloaliphatic hydrocarbons can be converted into cyclic alcohols and/or cyclic ketones by treating them with oxygen or gases containing oxygen in the liquid phase, in the presence of oxidation catalysts. This method of operation in which one or more oxidation stages are required has the shortcoming that after some time high molecular weight polymerization products are formed which accrete to the walls of the reactor with the result that the latter is clogged and the catalyst retained and rendered inactive.

We have now found, and this is the object of our invention, that the production of cyclic alcohols and ketones by the oxidation of saturated cycloaliphatic hydrocarbons in the liquid phase with oxygen or gases containing oxygen in the presence of oxidation catalysts can be carried out with any such polymerization being avoided by conducting the oxidation in the presence of metals of the group consisting of cobalt, manganese, lead and chromium in the form of their organic compounds and adding free organic acids to the initial materials forming the charging stock.

As initial materials for this process we are using saturated cycloaliphatic hydrocarbons, for example cyclohexane, methylcyclohexane or cyclo-octane. The oxidation occurs at raised temperature, for example between 120° and 160° C.—for example at 135° to 145° C. in the case of cyclohexane—and at atmospheric or increased pressure, for example between 1 and 50 atmospheres. The oxidation catalysts used in the practice of our invention are those conventionally used in oxidation processes. Preferred catalysts of this type are cobalt, manganese, lead and/or chromium in the form of their organic compounds, especially as salts of organic acids. The use of the stearates, phenolates, naphthenates and resinates of the said metals has proved especially suitable. It is also possible to co-employ other substances which accelerate the oxidation, as for example peroxides. As free organic acids there are used aliphatic mono- or dicarboxylic acids with 1 to 12 carbon atoms as well as the corresponding hydroxyacids or oxo-acids. Mixtures which contain these acids can also be used. The acids must be soluble at least to a slight extent in the initial materials. It is advantageous to use carboxylic acids with 2 to 6 carbon atoms, preferably dicarboxylic acids. It is preferable to use the carboxylic acids which result in the oxidation of the saturated cycloaliphatic hydrocarbons by the process itself. Examples of such acids are oxalic acid, succinic acid, glutaric acid, caproic acid, hydroxycaproic acid and adipic acid. The free organic acids added to the initial materials are employed in the form of aqueous solutions. Any suitable device providing for the initial materials and the solution of the free organic acids added being efficiently mixed may be used with a view to aiding the absorption of the free organic acids by the initial materials, for example stirrer-fitted apparatus or trickling towers.

In the practice of the process in accordance with our invention free organic acid is added in an amount of 0.05 to 1.5%, especially 0.05 to 1%, to the initial material before the latter is fed into the first reactor. Since the carboxylic acids formed as byproducts in the process itself are especially suitable additives within the purport of our invention, the preferred practice is to add part of the reaction product itself or the acid substances isolated therefrom in conjunction with the wash water. When in the practice of our process a plurality of reactors is used, the reaction mixture in the second and any subsequent reactor usually already contains a sufficient amount of acids so that an addition of acids before any such reactor is no longer necessary.

It has heretofore been proposed to subject the reaction products of the oxidation to a washing with water. When a plurality of reactors is used, the washing may also be interposed between the individual reactors. Since the water mainly absorbs the acid oxidation products, the initial materials can be contacted with this washing water prior to being fed into the first reactor. The washing water mainly contains adipic acid, caproic acid and hydroxycaproic acid, but also some glutaric acid, succinic acid and oxalic acid. The initial material on being contacted with the washing water, absorbs acids or acid constituents therefrom to the extent of preventing the formation of polymers during the reaction, after the water has been separated. The addition of the acid reaction products of the acid washing water is preferably effected by return pumping, if desired with the operating pressure. When carrying out the process in a plurality of series-connected reactors, however, one embodiment of our invention may be by removing the acid constituents only to such an extent by the washing treatment that the acid substances remaining in the reaction mixture are still sufficient to avoid polymerization, i.e. that the oxidation mixture after the washing treatment and water removal contains not more than 1.5%, preferably 1%, and not less than 0.05% of acid. When working in this way, acids are added to the initial materials just prior to feeding the reactants into the first reactor. As soon as the initial materials have absorbed these acids, the water is removed and they are fed into the reactor in a heated state while at the same time oxygen or gas containing oxygen is introduced in fine dispersion and the oxidation catalyst, preferably in dissolved form, is introduced, for example sprayed in. The initial materials are preferably preheated to a temperature which lies about 10° to 50° C. below the oxidation temperature. For example 20 to 70 cubic meters of air are supplied to the reactor for 1000 kilograms of liquid mixture. Instead of air, any other suitable gas containing oxygen or even oxygen itself may be used.

The following examples will further illustrate this invention but the invention is not restricted to these examples.

*Example 1*

5 cubic meters of cyclohexane which have been preheated to 95° C. are fed each hour into a reactor having a capacity of 1.8 cubic meters at a pressure of 30 atmospheres. At the same time, 250 cubic meters of air are fed in per hour. The catalyst used is 10 grams of cobalt in the form of a solution of cobalt naphthenate in cyclohexane. The temperature in the reaction vessel amounts to 140° C. and is kept constant by the air introduced cold and the preheated cyclohexane.

The oxidation mixture leaving the reactor together with the used air at a temperature of 140° C. is mixed per hour with 50 kilograms of water, cooled to 90° C. and freed in an adjacent separator from the aqueous layer which is run off at the bottom of the separator. Half of the aqueous layer is contacted with cyclohexane and separated from cyclohexane again in a subsequent separator. The cyclohexane leaving the separator has absorbed from the aqueous layer 0.2% of acid (mainly adipic acid and hydroxycaproic acid) and 0.05% of acid esters and peroxy compounds. This cyclohexane thus pretreated is used as initial material for the oxidation.

The oxidation mixture which has thus been substantially freed from the acid constituents is mixed with 75 kilograms of a 10% caustic soda solution. In a separator the liquor laden with the residual acid constituents is then separated from the oxidation product. The latter is introduced into a distillation column. With the temperature of the sump being about 110° C., unchanged cyclohexane passes over. The reaction mixture removed from the sump in an amount of 150 kilograms per hour still contains about 25% of cyclohexane. This mixture is treated at 60° to 70° C. with 10 kilograms of 20% caustic soda solution and, after separation of the solution, washed with 10 kilograms of water. The reaction mixture thus purified is freed from residual cyclohexane by distillation and then separated by subsequent vacuum distillation into 43 kilograms of cyclohexanone, 56 kilograms of cyclohexanol and 10 kilograms of high boiling residue which mainly consists of condensed cyclohexanone.

When operating in the same manner, using a 0.5% aqueous solution of adipic acid as an addition to the moist cyclohexane feed stock, instead of treating the cyclohexane feed stock with the washing liquor, the same good result is obtained.

*Example 2*

5 cubic meters of cyclohexane per hour are fed into a reactor with a capacity of 1.8 cubic meter at a temperature of 95° C. and a pressure of 30 atmospheres along with 250 cubic meters of air per hour, 20 grams of manganese resinate being used as a catalyst. The reaction temperature is 140° C.

When a 0.5% aqueous solution of adipic acid is added to the cyclohexane prior to being charged into the reactor, there are no deposits formed in the latter.

The same result is obtained if, instead of 0.5% of adipic acid, 1% of propionic acid or 1% of butyric acid or 0.6% of a mixture of equal parts of malonic acid and succinic acid is used.

On processing the reaction products 43 kilograms of cyclohexanone, 56 kilograms of cyclohexanol and 10 kilograms of high-boiling bottoms are obtained.

*Example 3*

5 cubic meters of cyclohexane per hour are fed into a reactor with a capacity of 1.8 cubic meter at a temperature of 95° C. and a pressure of 30 atmospheres along with 250 cubic meters of air per hour, 20 grams of lead stearate being used as a catalyst. The reaction temperature is 140° C.

When a 0.6% aqueous solution of hydroxycaproic acid and adipic acid is added to the cyclohexane prior to being charged into the reactor, there are no deposits formed in the latter.

On processing the reaction products 32 kilograms of cyclohexanone, 42 kilograms of cyclohexanol and 8 kilograms of high-boiling bottoms are obtained.

We claim:

1. In a continuous method of producting cyclic alcohols and ketones by the oxidation of saturated cyclic hydrocarbons having from 6–8 C-atoms with a gas containing oxygen in the presence of a metal-containing oxidation catalyst, the improvement which comprises subjecting the reaction products of the oxidation to a water wash, contacting said saturated cyclic hydrocarbon feedstock with this wash water whereby a quantity of from about 0.05 to about 1.5% of the acids contained in the wash water with reference to the feedstock is added to said feedstock, and thereafter oxidizing said treated feedstock after the wash water has again been separated from the saturated cyclic hydrocarbons.

2. In a continuous method of producing cyclohexanol and cyclohexanone by the oxidation of cyclohexane in the liquid phase with a gas containing oxygen in the presence of a metal-containing oxidation catalyst, the improvement which comprises subjecting the reaction products of the oxidation to a water wash, recovering the wash water, contacting the cyclohexane feedstock with said wash water whereby a quantity of from about 0.05 to about 1.5% of aliphatic carboxylic acids from the wash water with reference to said feedstock is added to the feedstock, again separating said wash water from said feedstock and oxidizing the so-treated cyclohexane feedstock.

References Cited in the file of this patent

UNITED STATES PATENTS

| | | |
|---|---|---|
| 2,223,494 | Loder | Dec. 3, 1940 |
| 2,684,984 | Finch et al. | July 27, 1954 |
| 2,790,004 | Dougherty | Apr. 23, 1957 |
| 2,825,742 | Schueler et al. | Mar. 4, 1958 |